United States Patent [19]

Economy et al.

[11] 4,075,276
[45] Feb. 21, 1978

[54] BORON NITRIDE-BORON NITRIDE COMPOSITES

[75] Inventors: James Economy, Eggertsville, N.Y.; Choll K. Jun, Greensburg, Pa.; Ruey Y. Lin, Williamsville, N.Y.

[73] Assignee: The Carborundum Company, Niagara Falls, N.Y.

[21] Appl. No.: 446,452

[22] Filed: Feb. 27, 1974

[51] Int. Cl.$^2$ ............................................. C04B 35/58
[52] U.S. Cl. .................................... 264/332; 264/60; 264/65; 264/171
[58] Field of Search ................. 264/60, 65, 66, 332, 264/85, 171; 106/65

[56] References Cited

U.S. PATENT DOCUMENTS

| | | | |
|---|---|---|---|
| 3,429,722 | 2/1969 | Economy et al. | 264/66 |
| 3,668,059 | 6/1972 | Economy et al. | 161/169 |
| 3,720,740 | 3/1973 | Muta et al. | 264/332 |
| 3,734,997 | 5/1973 | Mandorf, Jr. et al. | 264/65 |
| 3,837,997 | 9/1974 | Economy et al. | 264/332 |

*Primary Examiner*—Robert F. White
*Assistant Examiner*—John A. Parrish
*Attorney, Agent, or Firm*—David E. Dougherty; Raymond W. Green; Herbert W. Mylius

[57] ABSTRACT

Boron nitride-boron nitride composite bodies may be produced by combining pure boron nitride fibers with partially nitrided fibers consisting essentially of B, N, O, and H, and hot pressing the composite at elevated temperatures and pressure. The partially nitrided material serves as a source of matrix material for the boron nitride fibers, and when fiber orientation is properly controlled, bodies of extremely high strength may be obtained. Densities in excess of 1.5 g./cc. may be obtained, in a one-step process which overcomes difficulties inherent in multiple-step nitriding and re-nitriding processes.

9 Claims, No Drawings

BORON NITRIDE-BORON NITRIDE COMPOSITES

BACKGROUND OF THE INVENTION

This invention relates to relatively high density and high purity boron nitride-boron nitride (BN-BN) composites. More particularly, this invention relates to a composite body prepared from boron nitride fibers and partially nitrided precursor fibers.

Boron nitride possesses a number of highly desirable properties which render it useful in a wide variety of applications. Its high electrical resistivity coupled with its high thermal conductivity make it especially useful in electrical and electronic applications requiring a material which simultaneously acts as an electrical insulator and a thermal conductor. Its excellent thermal shock resistance renders it effective as a refractory at temperatures up to 1600° C or higher in a non-oxidizing atmosphere, and at temperatures as high as 700° to 900° C in air. It is highly corrosion resistant, being inert to most organic liquids and many corrosive chemicals and displaying excellent resistance to attack by various molten metals. Furthermore, because of its low dissipation factor over a wide temperature range this material is well suited for use as microwave and radar dielectric components (radar windows).

In U.S. Pat. No. 3,429,722, assigned to the same assignee as the present invention, James Economy et al have disclosed boron nitride fibers and a method of making them which comprises heating boric oxide fibers in an ammonia atmosphere under specified conditions. In accordance with the teachings of this patent, fibers incorporating a boron and nitrogen containing containing composition may be produced by reacting, with a nitrogen and hydrogen containing composition, fibers of $B_2O_3$ having a maximum diameter of 20 to 30 microns. Preferably, boric oxide fibers with a maximum diameter of about 10 microns are heated in an ammonia atmosphere according to a specified temperature program to produce fibers consisting essentially of boron nitride.

In U.S. Pat. No. 3,668,059, James Economy et al have disclosed a high modulus boron nitride fiber having a diameter of less than 10 microns, and a Young's modulus of elasticity of at least about $15 \times 10^6$ psi., prepared by heating a partially nitrided fiber consisting essentially of boron, oxygen, hydrogen and nitrogen at a temperature of at least 1800° C under longitudinal tension.

In copending application, U.S. Ser. No. 124,919, filed Mar. 16, 1971, now U.S. Pat. No. 3,837,997, issued Sept. 24, 1974, Economy et al disclose a low density product comprising boron nitride fibers bonded by boron nitride formed in situ. The porous fibrous product is formed by heating a mass of boron nitride fibers that has been impregnated with boric acid solution to an elevated temperature in ammonia.

In addition to the above-noted references relating to boron nitride fibers, shaped boron nitride bodies have also been prepared in the past. Such articles are disclosed, for example, by Taylor, U.S. Pat. No. 2,888,325, which teaches the use of a multiple stage nitriding process comprising intermittant addition of oxygen-containing boron compound at intermediate stages of nitriding, followed by further nitriding.

Boron nitride bodies are generally fabricated by press-molding and sintering techniques, broadly classifiable as hot-pressing, and cold-pressing followed by sintering. Boron nitride bodies produced by hot-pressing techniques generally have a high boron oxide ($B_2O_3$) content. While this material acts as a binder during hot pressing, and allows such bodies to be produced, it also causes a weakening of the properties of the resultant bodies produced. Thus, because of the presence of this material, hot pressed boron nitride articles have been weak at high temperatures, exhibited a permanent expansion upon heating to 1800° C and cooling to room temperature, and absorbed atmospheric moisture to the extent that the boric acid formed thereby can cause cracking upon exposure to rapid heating.

To overcome these problems, Mandorf et al, in U.S. Pat. No. 3,734,997, teaches treating hot-pressed boron nitride articles with a suitable solvent to lower boron oxide content, followed by sintering in an inert atmosphere at a temperature of from 1800° C to 2100° C.

Attempts at forming high-density boron nitride bodies have also included chemical vapor deposition techniques, whereby a boron nitride body is subjected to a gaseous nitriding atmosphere and heated to reaction temperatures.

These various techniques for densification pose a common problem: each requires penetration of the boron nitride body by a solvent or reactant material. As density increases, obviously the ability of the specified material to penetrate into the structure, and thus permit complete reaction, and/or removal of $B_2O_3$, decreases. Accordingly, the preparation of high density boron nitride materials has been a time-consuming and expensive process.

Pyrolytic boron nitride having a density in excess of 1.90 g./cc. has been produced by the reaction of boron trichloride and nitrogen. However, this method has been unsuccessful in producing articles greater than ¼ to ½ inch in thickness. Further, the properties of this material are extremely anisotropic in nature. For example, such material has a flexural strength of about 15,000 psi. at room temperature, perpendicular to the crystal plane orientation, but less than about 2500 psi. parallel to the crystal planes.

SUMMARY OF THE INVENTION

It has now been found that high density bodies of desired configuration and high purity may be prepared by combining essentially pure boron nitride fibers with partially nitrided fibers consisting essentially of B, N, O, and H, wherein nitrogen constitutes from about 30% to about 55% of the fiber, and hot pressing.

The process of the invention may comprise a single step or a plurality of formation steps. Thus, one may hot-press a blend of fibers, or one may build a layered structure of oriented blended fibers, as hereinafter set forth, and hot-press the composite. The product obtained in either instance is characterized by high density, high purity, good flexural strength, and excellent heat transmission characteristics.

DESCRIPTION OF PREFERRED EMBODIMENTS

As indicated, the composite bodies of this invention are prepared from two distinct boron nitride fiber materials, one of which is fully nitrided, i.e., essentially pure boron nitride, while the other is partially nitrided, i.e., an intermediate in the preparation of pure boron nitride from boric oxide.

Essentially, the partially nitrided fiber is prepared in accordance with the method disclosed by Economy et al, U.S. Pat. No. 3,668,059. In preparing the partially nitrided fiber, a fiber consisting essentially of boric oxide and having a maximum diameter of about 10 microns is heated in an ammonia atmosphere. The heating is started at a relatively low temperature and the temperature is increased at a suitable rate to a suitable final temperature at which temperature the fibers may be held for a suitable time if necessary. The heating is carried out under such conditions of rate of temperature rise, final temperature, and duration of holding at the final temperature so as to produce, by virtue of a complex reaction or series of reactions that occurs between the boric oxide and ammonia, a partially nitrided boric oxide fiber which consists essentially of boron (B), nitrogen (N), oxygen (O), and hydrogen (H). More particularly, it has been found that the critical feature of such a partially nitrided fiber which is indispensable to its utility in accordance with this invention is that it contains from about 30% to about 55%, and preferably from about 40% to about 50% nitrogen. Accordingly, the combination of temperature conditions selected for heating the boric oxide fiber in the ammonia atmosphere is such as to produce a partially nitrided fiber containing nitrogen in an amount within the ranges stated.

It has also been found that when a partially nitrided fiber is heated in an inert atmosphere at a sufficiently high temperature, e.g., 1800° C, a further complex reaction or series of reactions occurs very rapidly within the fiber, accompanied by the dissipation of volatile substances, and the partially nitrided fiber is converted to a fiber consisting essentially of boron nitride. However, it is observed that considerable longitudinal shrinkage or shortening of the fiber occurs during this high temperature reaction, as much as about 20% shrinkage being common, presumably due to the loss of some of the fiber constituents due to volatilization. A slight decrease in the diameter of the fiber may also occasionally occur. But more particularly, it is observed that such boron nitride fibers generally have a relatively low Young's modulus of elasticity in the range from about $4 \times 10^6$ psi. ($0.3 \times 10^6$ kg./sq. cm.) to about $6 \times 10^6$ psi. ($0.4 \times 10^6$ kg./sq. cm.), the common range for commercially available boron nitride fibers.

However, in accordance with the process taught by U.S. Pat. No. 3,668,059, a fiber consisting essentially of boron nitride, but having a relatively high Young's modulus of elasticity, may be produced by heating a partially nitrided boric oxide fiber consisting essentially of B, O, H and from about 30% to about 55%, preferably from about 40% to about 50%, nitrogen, in an inert atmosphere at a temperature of at least about 1800° C, and preferably at least about 2000° C, while subjecting the fiber to sufficient longitudinal tension as to at least prevent the longitudinal shrinkage which would otherwise occur, and to cause crystallite orientation within the fiber. As a result of the tension, the loss of volatile materials from the fiber during this heating is reflected in a decreased diameter of the fiber, rather than decreased length. More importantly, however, the Young's modulus of elasticity of the resulting boron nitride fiber, as measured parallel to the longitudinal axis of the fiber is significantly greater than that of a fiber produced in the same manner but without longitudinal tension during the heating. Some increase in modulus is observed upon merely employing enough tension as to prevent longitudinal shrinkage. A greater increase is observed when the tension is sufficient to cause elongation, and in general, the greater the elongation, the higher the modulus. The resulting fiber, which is polycrystalline, consists essentially of boron nitride and is characterized by a relatively high Young's modulus of elasticity which is generally greater than $6 \times 10^6$ psi. ($0.4 \times 10^6$ kg./sq. cm.), preferably at least about $15 \times 10^6$ psi. ($1.1 \times 10^6$ kg./sq. cm.), or higher, and which may be as high as about $75 \times 10^6$ psi. ($5.2 \times 10^6$ kg./sq. cm.). While either form of pure boron nitride fiber set forth above may be used, the higher modulus fiber is preferred.

The invention will be described further with reference to the following examples, which are intended to illustrate and not to limit the invention, and the subsequent detailed discussion of preferred embodiments.

EXAMPLE 1

Preparation of Partially Nitrided Fibers

Molten boric oxide is melt spun in a conventional manner through an 800-tip bushing to product a continuous multifilament yarn consisting of 800 filaments of boric oxide, the filaments being 7.5 microns in diameter.

Approximately 10 g. of the yarn is partially nitrided in the following manner, employing a vertical tube furnace comprising a vertical heat resistant glass tube externally equipped with electrical resistance heating wire. The yarn is suspended loosely in the glass tube, and ammonia gas is introduced into the bottom of the tube at a rate of 14.5 l./min., the upper end of the tube being vented to the atmosphere. While maintaining the ammonia current through the tube, the yarn is heated to 210° C over a period of 0.5 hour, then from 210° C to 550° C at a rate of 3.8° per hour, and then from 550° C to 710° C at a rate of 3.5° C per hour. The temperature is held at 710° C for 1 hour and the furnace and its contents are permitted to cool to room temperature (about 25° C), at which point the ammonia flow is discontinued.

The resulting product is an 800-strand continuous multifilament yarn consisting of partially nitrided filaments having a diameter of 7.5 microns and a density of 1.6 g./cc. Elemental analysis indicates that the product contains 35.5% B and 46.9% N, the balance being oxygen primarily, and a small amount of hydrogen.

EXAMPLE 2

Conversion of Partially Nitrided Fibers to Boron Nitride Fibers Without Tension

Partially nitrided multifilament yarn prepared as in Example 1 is converted to boron nitride multifilament yarn in the following manner. The apparatus employed for the conversion comprises a graphite susceptor tube horizontally disposed within the coil of a high frequency electrical induction furnace, the tube and coil being enclosed in an outer glass chamber having suitable ports to permit the passage therethrough of the yarn being treated and to facilitate control of the furnace atmosphere. The susceptor tube is 15 cm. long and has a hot zone about 2.5 cm. long. A variable speed motor-driven take-up spool is used to continuously pull the yarn through the susceptor tube and outer chamber from a freely turning supply spool on which the yarn to be converted is wound, the two spools being mounted outside the opposite ends of the chamber in such positions that the yarn being drawn through the susceptor tube is coaxial with the longudinal axis of the tube.

The chamber is purged with nitrogen and a continuous slow current of nitrogen is passed through the chamber to maintain an inert, non-oxidizing atmosphere. The take-up spool motor is turned-on, being set to draw the partially nitrided yarn through the furnace at a rate of 20 cm./min., the resident time of the yarn in the 2.5 cm. hot zone thus being about 8 seconds. The furnace is turned on and heated rapidly to 2000° C as measured by an optical pyrometer sighted in the hot zone, the temperature then being held at 2000° C while the yarn is being drawn through. By measuring the input rate of the yarn from the supply spool and comprising that rate with the relatively slower take-up rate, it is computed that the yarn undergoes a longitudinal shrinkage of about 20% as it passes through the hot zone.

The resulting multifilament yarn is composed of filaments having an average diameter of about 7.5 microns and consisting essentially of boron nitride. Anal.: B, 42.85%; N, 56.49%; total B + N, 99.34%. Measurements on a plurality of filaments selected at random from the yarn shown an average Young's modulus of elasticity of $5.1 \times 10^6$ psi. ($0.36 \times 10^6$ kg./sq. cm.).

EXAMPLE 3

Conversion to Boron Nitride Fibers with Tension to Prevent Shrinkage

Partially nitrided multifilament yarn similar to that prepared in Example 1, but having a filament diameter of 6 microns and containing 42% nitrogen, is converted to boron nitride multifilament yarn as in Example 2, but at a temperature of 2100° C. Also, torque is applied to the supply spool to restrict free rotation thereof and to apply just sufficient longitudinal tension to the filaments as to prevent longitudinal shrinkage during the heating, the tension on the filaments being approximately 100 pounds per square inch (7 kg./sq. cm.) of cross-sectional area.

The resulting multifilament yarn is composed of filaments having an average diameter of 5.2 microns and consisting essentially of boron nitride. Anal.: B, 43.29%; N, 56.61%; total B + N, 99.90%. Average Young's modulus of elasticity, $6.8 \times 10^6$ psi. ($0.48 \times 10^6$ kg./sq. cm.).

EXAMPLE 4

Conversion to Boron Nitride Fibers With Tension to Effect Elongation

Partially nitrided yarn similar to that prepared in Example 1, but having a filament diameter of 6 microns and containing 42% nitrogen, is converted to boron nitride yarn as in Example 2, but at a temperature of 1800° C. Also, torgue is applied to the supply spool to apply sufficient longitudinal tension to the filaments as to cause about 10% elongation thereof during the heating, the tension on the filaments being approximately 800 psi. (56 kg./sq. cm.) of cross-sectional area. The extent of elongation is readily computed from a comparison of the take-up rate with the relatively slower supply rate.

The resulting yarn is composed of filaments having an average diameter of about 4.5 microns and consisting essentially of boron nitride. Anal.: B, 42.01%; N, 56.54%; total B + N, 98.55%. Average Young's modulus of elasticity, $15.2 \times 10^6$ psi. ($1.01 \times 10^6$ kg./sq. cm.).

EXAMPLE 5

Conversion to Boron Nitride Fibers With Tension to Effect Elongation

The partially nitrided yarn prepared in Example 1 is converted to boron nitride continuous multifilament yarn as in Example 2, at a temperature of 2000° C, but torque is applied to the supply spool to apply a longitudinal tension on the filaments of about 800 to 1000 psi. (56 to 70 kg./sq. cm.) of cross-sectional area. From the established take-up rate of 1 ft./90 sec. (20 cm./min.) and the measured supply rate of 1 ft./110 sec. (16 cm./min.), it is computed that the filaments elongated by about 22% during the heating.

The resulting yarn is composed of filaments having an average diameter of 5.7 microns and consisting essentially of boron nitride. Anal.: B, 43%; N, 56%; total B + N, 99%. Average Young's modulus of elasticity, $29.3 \times 10^6$ psi. ($2.05 \times 10^6$ kg./sq. cm.); average tensile strength, $81.5 \times 10^3$ psi. ($5.7 \times 10^3$ kg./sq. cm.); average density 21. g./cc.

The Young's modulus of elasticity and the tensile strength of the boron nitride fibers were measured, the Young's modulus being $34.2 \times 10^6$ psi. ($2.4 \times 10^6$ kg./sq. cm.), and the tensile strength being $84 \times 10^3$ psi. ($5.9 \times 10^6$ kg.sq. cm.) for 5.0 micron diameter fibers. By employing partially nitrided fibers of somewhat smaller diameter than those employed in the present example, boron nitride fibers having a Young's modulus of about $40 \times 10^6$ psi. ($2.8 \times 10^6$ kg./sq. cm.) may readily be produced. The same result may be accomplished by employing greater tension to increase the extent of elongation of the fibers during conversion. Under optimum conditions of diameter and composition of the partially nitrided fibers, temperature, amount of tension and the like, boron nitride fibers may be produced having a Young's modulus as high as about $75 \times 10^6$ psi. (5.2 kg./sq. cm.).

It will be understood that, while furnaces such as those employed in the examples are convenient, other types of furnaces familiar to those skilled in the art and capable of generating the requisite temperature and containing the required atmosphere may be used, including vertical or horizontal tube or induction furnaces.

Now considering the various aspects of the invention in detail, boric oxide fibers suitable for precursors of the fibers used in the practice of the invention may readily be prepared by conventional techniques such as those employed in producing glass fibers. Thus, for example, continuous boric oxide fibers may be spun from a boric oxide melt, being wound upon a revolving spool. Alternatively, boric oxide fibers may be blown in staple form by the conventional technique of causing a jet of any suitable gas to impinge upon a thin falling stream of molten boric oxide. Fibers having a diameter of a few microns or less, as well as coarser fibers, may easily be produced by melt spinning, and fibers having diameters in the submicron range, as well as coarser fibers, may be obtained by blowing. If the boric oxide melt contains a small amount of silica, the fibers will likewise contain a small amount of silica, which is not objectionable, since the silica remains unaffected by the process of the invention and the resulting fibers consist essentially of boron nitride but also contain a small amount of silica.

For the purposes of the preparation of the partially nitrided fibers, there appears to be no critical minimum diameter of the boric oxide fibers which may be employed, but they should have a diameter no greater than about 10 microns. When fibers of greater diameter are employed, the ammonia may have difficulty penetrating to the core of the fibers, and the resulting partially nitrided fibers are likely to be non-uniform in composition throughout their cross section.

Partially nitrided fibers containing from about 30% N to about 55% N have been found suitable for use in the present invention. Fibers having a nitrogen content of from about 40% to about 50% are preferred.

The precise composition of the partially nitrided fibers is extremely complex, and no attempt need be made here to describe it in detail, since it is the nitrogen content that is critical. In addition to nitrogen in the stated amount, the fibers consist essentially of B, O, and H. Analyses to determine the precise amounts of O and H present in a given sample have proven difficult and unreliable.

The partial nitriding step may be carried out under a wide range of conditions to produce fibers having the required nitrogen content. The nitrogen content of the fibers is governed by three parameters, viz., the rate of temperature rise, the final temperature, and the duration of holding at the final temperature. In general, the faster the rate of temperature rise, the lower the N content; and the higher the final temperature and the longer the duration of holding at the final temperature, the higher the N content.

The heating is carried out in an ammonia atmosphere. In some types of furnaces having a large capacity, and especially when only a small quantity of fibers is to be treated, the atmosphere may be established at the outset of the heating cycle and remain static. In other types of furnaces, such as tube furnaces, especially when a substantial quantity of fibers is to be treated, it may be necessary to maintain the ammonia atmosphere as a current through the furnace, at a flow rate which is sufficient to remove the gaseous by-products produced during the reaction and to provide a constant fresh supply of ammonia for the reaction. In such a case, it may be desirable to preheat the ammonia to a suitable temperature before introducing it into the furnace, to avoid decreasing the temperature within the furnace.

Partially nitrided fibers containing the specified amount of N may be converted to fibers consisting essentially of boron nitride and having a relatively high modulus of elasticity by heating them at least about 1800° C in an inert atmosphere while subjecting them to longitudinal tension. The conversion to boron nitride takes place almost instantaneously, and is preferably carried out in a continuous fashion as in the examples, through batchwise conversion is possible.

A temperature of at least about 1800° C is required for the conversion, since at lower temperatures the conversion may be incomplete and the resulting fibers may be relatively impure. For example, if Example 5 is carried out at a temperature of 1700° C instead of 2000° C, the resulting fibers are found to contain 41.82% B and 52.26% N, a total of only 94.08% B + N, the balance being primarily oxygen. A temperature of at least about 2000° C is preferred, to insure substantially complete conversion, and because temperatures of about 2000° C and higher tend to render the fibers more susceptible to elongation under tension. Considerably higher temperatures may be employed within the capability of the apparatus used and with regard to the fact that boron nitride sublimes at about 3000° C.

In order to achieve a significant improvement in modulus of elasticity, at least sufficient longitudinal tension must be employed as to prevent longitudinal shrinkage of the fibers. Preferably, sufficient tension is applied as to achieve orientation of the crystallites. Ideally, the amount of tension is such as to effect maximum orientation, the extent of orientation generally increasing with increasing tension and the modulus of the fibers generally increasing with increasing orientation.

Any suitable inert atmosphere may be employed for the conversion, such as nitrogen, argon, helium, neon and the like. A vacuum may be employed, but is less convenient. Atmospheres containing appreciable amounts of oxygen, or substances such as water which will decompose to form oxygen at the temperatures employed, are not suitable since the product is subject to oxidation at these temperatures. When converting substantial amounts of fibers, it is generally desirable to maintain a current of the inert gas through the furnace to remove the by-products of the conversion.

Boron nitride fibers produced according to the method set forth above are characterized by a relatively high Young's modulus of elasticity, as measured parallel to the longitudinal axis of the fiber. For use in the composites of the present invention, a modulus of at least about $15 \times 10^6$ psi. ($1.1 \times 10^6$ kg./sq. cm.) is preferred. The fibers are polycrystalline, have a density closely approaching the theoretical density of boron nitride (2.25 g./cc.), and consist essentially of boron nitride, being of high purity as is evidenced by the fact that they almost invariably have a combined B and N contact above 98%, and often above 99%. Such high purity is reflected in superior resistance to oxidation and corrosion. The diameter of the fibers is necessarily less than about 10 microns, since they are derived from boric oxide fibers and partially nitrided fibers having a maximum diameter of about 10 microns and since a decrease in diameter occurs during conversion of the partially nitrided fibers to boron nitride fibers under tension.

Although as previously indicated, boron nitride fibers produced by other techniques may be used in the practice of this invention, the boron nitride fibers produced as herein described are preferred in view of their high strength.

When preparing composites of boron nitride fiber and partially nitrided fibers, no additives or binders are required. However, for specific usages and purposes, additive materials such as finely ground silica may be used.

The composite material of this invention may comprise pure boron nitride fibers in combination with from 10 to 90 wt. percent partially nitrided fibers. The partially nitrided fibers, when subjected to the process of this invention in the presence of boron nitride fibers, provide a boron nitride matrix formed in situ about the previously formed boron nitride fibers. The preferred ratio of boron nitride fibers to partially nitrided fibers is about 70:30, although other ratios within the range of from 90:10 to 10:90 have been found suitable. Extending the ratio beyond these limitations is possible, although the improvements obtained over a 100% boron nitride fiber or partially nitrided fiber starting material are only slight.

In combining the fibers, any suitable format may be utilized. That is, one may employ woven fabrics or felts, oriented or randomly distributed fibers, a totally random layer structure, or a rigidly controlled layer structure. The preferred embodiment consists of a laminar structure, with the fiber orientation in each individual lamina being at a 90° angle to the fiber orientation of the adjacent lamina, as exemplified by wood grain orientation in the production of plywood. This type of controlled orientation and structure results in highly uniform bodies having great strength. The presence of the partially nitrided fibers provides an adhesive means between adjacent laminae upon hot-pressing.

The composite fiber body may conveniently be made up directly in a high pressure mold assembly, or may be blended (if a random orientation of fibers is desired) separately and then placed in the mold. The mold is made of a suitable high temperature, high pressure material, such as graphite.

The fabrication process is essentially comprised of the following steps: (1) The fibers are properly oriented (as desired) in the mold; (2) The fibers are hot-pressed to decompose the partially nitrided fibers to boron nitride plus $B_2O_3$, and remove the $B_2O_3$; and (3) The specimen is further heat treated to stabilize, and remove any remaining $B_2O_3$.

The hot-pressing step is preferably carried out with a rapid heating to the pressing temperature. The fibers are compacted during this procedure, and rapid temperature elevation results in more efficient $B_2O_3$ removal from the structure. Further, this rapid heating limits the conversion of boron nitride from the turbostratic to the hexagonal form, since the presence of $B_2O_3$ catalyzes this phase change.

Higher pressures clearly yield higher density of the final product, and should be chosen in accordance with the capability of equipment used, costs, and desired results. Rapid temperature elevation has been found to yield the best results, due to rapid elimination of $B_2O_3$, which is squeezed out of the body and/or evaporated under the compression forces applied. Decomposition of the partially nitride material commences at or about 1000° C, whereby $B_2O_3$ is released, and the partially nitrided fiber is converted to a boron nitride matrix.

The hot pressing should preferably be conducted at a temperature of from 1400° C to 1600° C, up to a maximum temperature of about the point of boron nitride reaction with the graphite. The minimum temperature should be in excess of the decomposition temperature of $B_2O_3$.

Pressure applied may vary from the minimum required to obtain cohesion of the fibers up to the pressure at which boron nitride fiber damage occurs. Suitable pressures may thus be from about 25 psi. to about 1000 psi. with from 200 to 500 psi. the preferred range. After rapidly reaching a temperature of from 1400° C to 1600° C, the specimen may be released from pressure and allowed to cool, or it may be subjected, under reduced pressure or the same pressure, to stabilization at a further elevated temperature of approximately 1800° C to 2200° C, preferably from 2000° C to about 2200° C. No critical time limitations have been found for the specimen being held at these elevated temperatures, although as previously indicated, a rapid temperature elevation is desirable. Thus, in one embodiment, this invention contemplates raising a specimen directly from room temperature to 2000° C, under pressure.

The present invention may better be illustrated by the following examples.

EXAMPLE 6

Preparation of Article Without Partially Nitrided Fibers

A sample of 4 g. of pure boron nitride fiber, prepared as in Example 2, is blown into a two-inch square graphite mold, with the fibers in parallel relationship. Further 4 g. samples of the same fiber are then blown into the mold, with each layer thus formed being oriented 90° from the previous layer until 80 g. of fiber have been placed in the mold. A plunger is inserted into the mold, and pressurized to 400 psi. The temperature is rapidly raised to 1400° C, at which it is held for 30 minutes, and then raised to 2000° C, and held for 15 minutes. Upon release and cooling, it is found that no fiber bonding has occurred.

EXAMPLE 7

Preparation of Composite Using Parallel Oriented Fibers

A blend of pure boron fibers, prepared as in Example 2, and partially nitrided fibers, prepared in accordance with Example 1, is placed in a two-inch square graphite mold, with the fibers in parallel relationship, layer by layer. The hot pressing was carried out in an electrical induction furnace in an argon atmosphere, as in Example 6, at a temperature of 1400° C, at 200 psi. for one hour. The hot pressed specimen had a density of about 1.85 g./cc. However, cracks were observed along the direction of fiber orientation.

EXAMPLE 8

Preparation of Laminar Article, 75% Boron Nitride Fibers

A laminar article comprising 25% partially nitrided fibers and 75% boron nitride fibers in each layer was prepared, with each layer being at a 90° angle to the orientation of the previous layer. The partially nitrided material was prepared as in Example 1, further reacted with ammonia at 1000° C for two hours to reduce the amount of $B_2O_3$ present. Hot pressing was at 1400° C, 200 psi., for one hour. No cracks were observed in the hot-pressed specimen. The specimen was then further heated at 2000° C in argon for one hour, which resulted in slight delamination.

EXAMPLES 9-17

Preparation of Laminar Articles, Varying Compositions and Conditions

A number of specimens were prepared as in Example 8, utilizing pure boron nitride fiber and partially nitrided fiber prepared in accordance with Example 1. Each layer was oriented at 90° to the previously deposited layer. The results of varying composition and conditions may be seen from Table I.

TABLE I

| Example | Partially Nitrided (grams) | Pure BN (grams) | Hot Press Conditions | | | Hot Press Conditions | | | Product Density |
|---|---|---|---|---|---|---|---|---|---|
| | | | ° C | psi | minutes | ° C | psi | minutes | |
| 9 | 32 | 48 | 1400 | 400 | 30 | 2000 | 400 | 15 | 1.4491 |
| 10 | 32 | 48 | 1400 | 400 | 30 | 2000 | 400 | 15 | 1.3776 |
| 11 | 32 | 48 | 1400 | 400 | 30 | 2000 | 400 | 15 | 1.4407 |

TABLE I-continued

| Example | Partially Nitrided (grams) | Pure BN (grams) | Hot Press Conditions ° C | Hot Press Conditions psi | Hot Press Conditions minutes | Hot Press Conditions ° C | Hot Press Conditions psi | Hot Press Conditions minutes | Product Density |
|---|---|---|---|---|---|---|---|---|---|
| 12 | 32 | 48 (yarn) | 1400 | 400 | 300 | Reduce to 300 then raise to 2000 | 400 | 30 | 1.3989 |
| 13 | 31 | 73 | 1400 | 400 | 30 | " | 400 | 30 | 1.3002 |
| 14 | 82 | 123 | 1400 | 400 | 30 | " | 400 | 30 | 1.4020 |
| 15 | 120 | 180 | 1400 | 400 | 30 | 2000 | 400 | 30 | 1.3345 |
| 16 | 140 | 210 | 1400 | 400 | 30 | 2000 | 400 | 30 | 1.5569 |
| 17 | 72 | 108 | 1400 | 400 | 30 | 2000 | 400 | 30 | 1.5515 |

Thus, it has been demonstrated that the present invention yields a process by which one may obtain boron nitride-boron nitride composite materials by a one-step technique. Whereas previous methods required long, tedious repetitive, and expensive processing, the present invention provides an economical, rapid, and efficient route for boron nitride-boron nitride composite manufacture. Just as in the case of carbon-carbon composite preparation, such a technique has long been sought. The preparation of boron nitride-boron nitride composites has previously been complicated by the necessity for nitriding of the composite body during manufacture. The present invention eliminates this difficult step, thus simplifying the process, and accordingly increasing ease and decreasing cost.

Values of Young's modulus of elasticity and tensile strength set forth therein were determined in accordance with A.S.T.M. D2101-64T. Percents referred to herein are percents by weight, except as otherwise stated or indicated by the context such as in respect to percent shrinkage or elongation.

While the invention has been described herein with reference to certain preferred embodiments, it is to be understood that various changes and modifications may be made by those skilled in the art without departing from the concept of the invention, the scope of which is to be determined by reference to the following claims.

We claim:

1. A process for the preparation of boron nitride-boron nitride composite bodies, comprising the steps of:
   a. forming a blend of from about 10 to about 90 percent of essentially pure polycrystalline boron nitride fibers with from about 90 to about 10 percent of partially nitrided boric oxide fibers, said boron nitride fibers and said partially nitrided boric oxide fibers having a maximum diameter of 10 microns, and said partially nitrided fibers consisting essentially of boron, oxygen, hydrogen, and from about 30 percent to about 55 percent by weight of nitrogen;
   b. forming a composite body of said blended fibers;
   c. heating said composite body, at a pressure of from about 200 to about 500 psi in an inert atmosphere, to a first elevated temperature at which essentially all boric oxide present is decomposed; and
   d. further heating said body to a second elevated temperature of from about 2000° C to about 2200° C.

2. A process as set forth in claim 1 wherein said partially nitrided fiber comprises from about 40 to about 45 weight percent nitrogen, and said first elevated temperature is from about 1400° C to about 1600° C.

3. A method for the preparation of shaped boron nitride-boron nitride composite bodies, said method comprising the steps of:
   a. forming a body of boron nitride fibers and partially nitrided boric oxide fibers, said boron nitride fibers and said partially nitrided boric oxide fibers having a maximum diameter of about 10 microns, said partially nitrided fibers consisting essentially of boron, nitrogen, oxygen, and hydrogen, wherein said nitrogen constitutes from about 30 percent to about 55 percent by weight of said partially nitrided fibers;
   b. placing said body in a mold of the desired configuration; and
   c. hot pressing said body, in an inert atmosphere at a pressure of from about 25 psi to about 1000 psi, at a temperature in excess of the decomposition temperature of boric oxide but less than about 2200° C.

4. A method as set forth in claim 3, wherein said hot-pressing elevates the temperature of said body to a temperature of from about 1400° C to about 1600° C.

5. A method as set forth in claim 4, wherein said pressure is from about 200 psi to about 500 psi.

6. A method as set forth in claim 3, wherein said hot-pressing elevates the temperature of said body to a temperature of from about 2000° C to about 2200° C.

7. A method as set forth in claim 6, wherein said partially nitrided fiber contains from about 40 percent to about 50 percent by weight nitrogen.

8. A method as set forth in claim 3, wherein said body is a laminate formed by depositing alternate layers of boron nitride fibers and partially nitrided boric oxide fibers in said mold, each said layer being oriented approximately 90° from the previously deposited layer.

9. In a process for the production of boron nitride bodies by hot pressing boron nitride fibers, the improvement which comprises forming a blend of such boron nitride fibers with from about 10 to about 90 weight percent of partially nitrided boric oxide fibers consisting essentially of boron, hydrogen, oxygen, and nitrogen, wherein said nitrogen constitutes from about 30 to about 55 percent by weight of said partially nitrided fibers, and hot pressing at a temperature between the decomposition temperature of boric oxide and about 2200° C.

* * * * *